Sept. 15, 1942.  H. C. BOSTWICK  2,296,016
TIRE MOLD
Filed Nov. 12, 1940
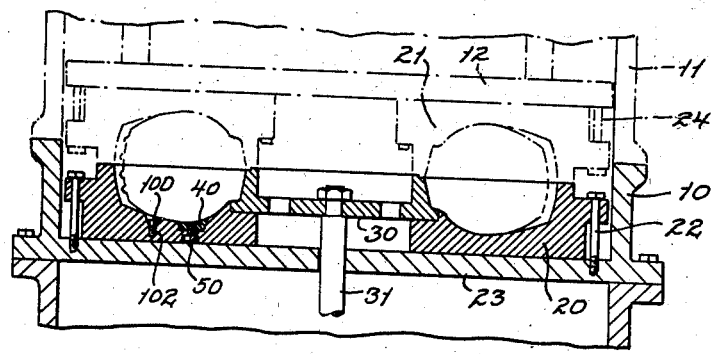
Fig. 1
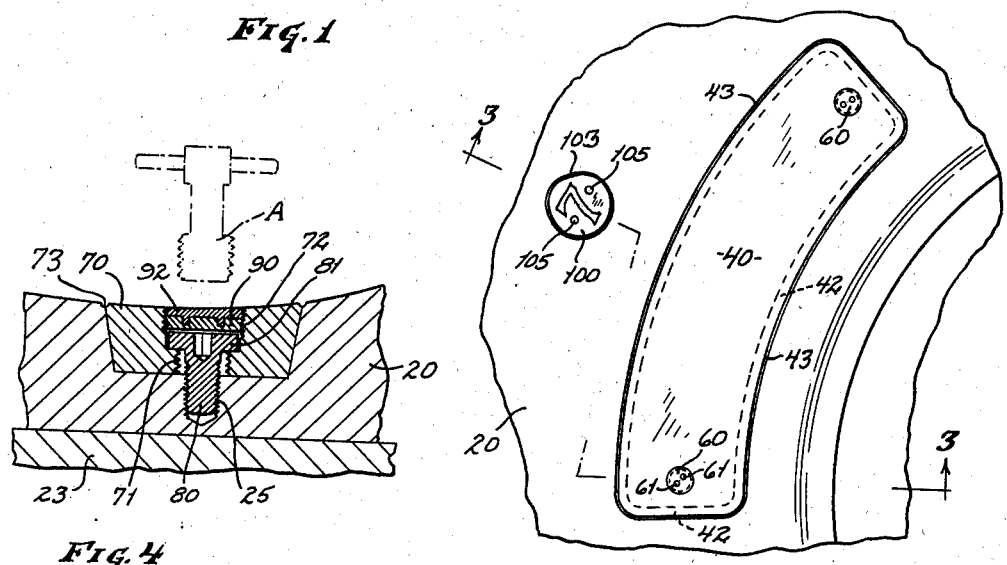
Fig. 4
Fig. 2
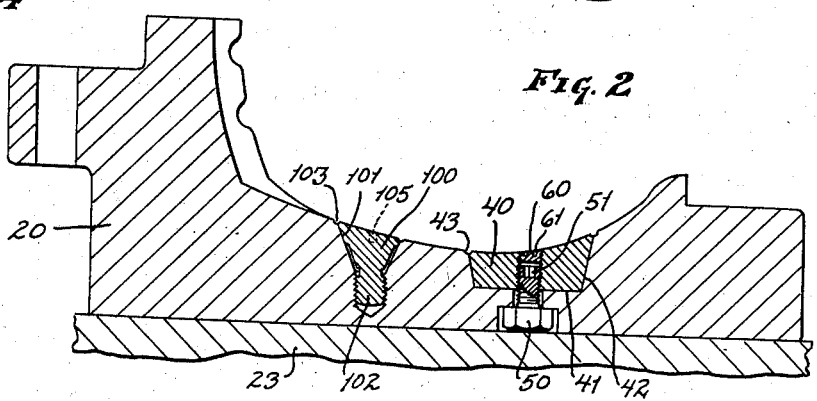
Fig. 3
INVENTOR.
BY Henry C. Bostwick,
Bates, Teare & McBean
Attorneys.

Patented Sept. 15, 1942

2,296,016

UNITED STATES PATENT OFFICE 2,296,016

TIRE MOLD

Henry C. Bostwick, Coventry Township, Summit County, Ohio, assignor to The Akron Standard Mold Company, Akron, Ohio, a corporation of Ohio Application November 12, 1940, Serial No. 365,337

11 Claims. (Cl. 18—38)

This invention relates to molds for automobile tires and particularly to a mold having a changeable insert for forming a suitable designation in the tire surface, as for instance the size of the tire or the name of the manufacturer. Heretofore, it has been customary to provide such insert secured in a recess in the mold body by bolts extending from the opposite side of the mold, and accessible only by removing the mold from the vulcanizing machine. As the molds are fastened in the machine, there has been a very decided delay and loss of time in disconnecting the mold from the machine and removing it to obtain access to the underside of the bottom mold, or the upper side of the top mold, in order to take out the bolts which secure the insert.

My invention provides securing means for the insert operable from within the mold cavity itself, so that the insert may be removed without taking the mold out of the press, or otherwise disconnecting it. Further, my invention comprises a vulcanizing mold having the usual tire cavity and an insert occupying a recess in the mold body and having its exposed face flush with that of the molding cavity, and a screw rotatable by a suitable tool acting in the mold cavity to free the insert so that it may be removed and replaced by a different insert without removing the mold from its support.

Preferred embodiments of my invention are illustrated in the drawing hereof and are hereinafter more fully explained, and the essential novel features are summarized in the claims.

In the drawing, Fig. 1 is a sectional elevation of my mold mounted in a vulcanizing press; Fig. 2 is a view on a larger scale of a portion of the mold having the insert, being a plan of a portion of the lower mold in the molding cavity; Fig. 3 is a cross section of the mold on the offset line plane indicated by the line 3—3 on Fig. 2; Fig. 4 is a cross section of a modified form of insert and securing means therefor.

In Fig. 1, 10 indicates the lower member of a suitable vulcanizing mold press having a chamber carrying the lower mold 20 secured thereto by bolts 22. 11 indicates the cooperating mold member carrying a movable plunger having a head 12 to which is secured the upper mold member 21 by bolts 24. A stripping plate 30 is shown mounted on a plunger 31, adapted to be raised when the molds are separated to discharge the molded tire from the lower mold 20. The construction so far described is of standard form.

40 indicates an arcuate insert carrying a suitable legend adapted to be impressed or molded onto tire casings. This insert is preferably a block of arcuate form, concave on the upper surface to continue the contour of the mold surface, as indicated in Figs. 3 and 4. On its lower surface, the block is flat as shown in 41, parallel with the bottom of the mold, while the side surfaces and the ends are tapered as indicated at 42.

In the construction of Figs. 2 and 3, the inserted block 40 is retained fixedly in place by two bolts 50, having heads occupying recesses in the under surface of the mold member 20. These bolts having threaded shanks extending freely through openings in the mold and engaging threads in the block 40. The upper end of the shank of the bolts 50 is formed with an angular recess 51 for the application of a correspondingly shaped wrench to turn the bolt.

The construction described holds the inserted blocks fixedly in place in the mold. The space beyond the end of the bolts 50 is closed by suitable means flush with the surface of the insert itself. As indicated in Fig. 3, this closing means may be a screw threaded plug 60 screwing into the thread of the insert and having a top surface flush with that of the insert. Suitable notches 61 in this plug furnish means for the application of a spanner wrench to turn the plug into place or to remove it.

With such a construction as described, after the tire has been molded and removed, whenever it is desired to remove the insert 40, it is only necessary to apply a suitable wrench and screw out the plug 60, and then by a suitable angular wrench rod entering the recess 51 to turn the bolts 50. The heads of these bolts rest on the plate 23 of the mold press and hence cannot go down, so the rotation of the bolt must cause the insert to rise. As soon as the insert has thus been forced upwardly, Fig. 3, a short distance, its inclined surface is entirely free from that of the mold and continued rotation of the bolts frees the insert entirely from the mold. This operation may be accomplished in a few minutes without removing the mold from the mold press.

Fig. 4 indicates a modified construction. In this case the insert, designated 70 has an exterior surface the same as the insert 40, but in place of the continuously threaded openings of a single bore through it, it has threaded openings of two bores, the bore adjacent the bottom of the insert being of smaller diameter than the upper bore. In this embodiment, a clamping cap screw 80 is inserted from above, through the bores of the insert, the threaded shank of the cap screw screwing into a threaded recess 25 in the mold. The head 81 of the cap screw overhangs the shoulder between the two bores 71 and 72 of the insert and hence pulls the insert tightly in place.

The head of the screw 80 is necessarily considerably larger than the shank; hence, the opening 72 into the insert is larger. I prefer to close this opening by first inserting a threaded plug 90 by means of a spanner wrench occupying notches in the plug, but instead of allowing the plug to remain flush with the surface of the insert, I screw it down some distance below the surface of the insert, and then I fill the space above the plug 90 with a suitable filler, as for instance Babbitt metal 92. After this Babbitt metal is poured into place, it is buffed off perfectly smooth and flush with the top surface of the insert 70.

When it is desired to remove the insert of Fig. 4, the filler 92 is simply dug out; a wrench inserted in the notch of the plug 90, the plug removed; a wrench rod inserted in the angular cavity in the cap screw 80 and the screw removed. Then to remove the insert, I screw into the threaded bore 71 a suitable removing tool indicated at A in Fig. 4, this tool having a shank with a handle, and at the lower end a portion externally threaded. Two of such tools being screwed into the two threaded bores 71 adjacent the ends of the insert, allow the ready removal of such insert.

It is sometimes desirable to mold onto the tire a number or other designation occupying a comparatively small space, but changeable for different tires molded by the same mold. Such an insert is indicated at 100 in Figs. 1, 2 and 3, shown as carrying on its face a numeral, as the numeral "7" of Fig. 2. This insert preferably has a conical head, as shown at 101, and a screw threaded shank 102 occupying a threaded bore in the mold. The conical surface of the plug is recessed as shown in Fig. 3, so that only the outer portion thereof may engage the mold. The top surface of the plug is formed so that it is flush with the surface of the mold itself and continues its curvature when the plug is tight in place. This plug may be inserted and screwed into place, and removed after insertion, by means of a spanner wrench applied to recesses 105 in the plug without changing the position of the mold.

At the junction of the surface of the insert with the surface of the mold proper, I may form a narrow marginal groove 43, 73 or 103 partly in the edge of the insert 40, 70 or 100 and partly in the mold itself, to cause a bead on the tire around the insert, thus preventing any visible blemish or mark on a tire between the surface which engages the mold proper and the surface which engages the insert. The spanner recesses 61 and 105 in the plug 60 or the insert 100 will form slight projections on the tire, but these are immaterial as they may be readily removed by buffing after the formation of the tire.

It will be seen that whether my insert is held by the means of Fig. 3 or Fig. 4 in the case of the arcuate insert, and also the conical plugs carrying the small designations—in any case, the insert is removable into the general cavity of the tire mold by a suitable tool manually manipulated in the cavity and adjacent space without removing the mold from the press. This introduces a very deciding saving of time in the changing operation, the time lost heretofore being a troublesome factor as the inserts need to be changed not infrequently.

I claim:

1. In a mold for an automobile tire, the combination of a mold member having a cavity for the formation of one side wall and part of a tread of the tire, a recess in such mold member communicating with the cavity, a block occupying the recess, a bolt for securing the block in the recess, said bolt having a head preventing the removal of the insert when the bolt is in place, the inner end of the bolt having means for the application of a wrench to rotate the bolt from within the mold cavity itself.

2. The combination with a pair of press heads of a mold member secured to each press head, said mold members having cooperating cavities for the formation of a tire, an arcuate recess formed in one of the mold members, passageways extending from the bottom of the recess into the mold member, headed screws having shanks occupying the passageways and their heads serving to hold the insert in place in the recess, and means for the application of a wrench to those ends of the screws which are adjacent the mold cavity, whereby the screws may be rotated by a wrench within the cavity itself.

3. The combination with a tire mold having a recess communicating with the molding cavity, a block removably mounted in the recess, the upper surface of the block being a continuation substantially of the surface of the mold, a headed screw engaging the block and mold for holding the block in place, the inner end of the headed screw being within the block below the face thereof and having provision at that end for the application of a wrench, whereby tools operable from within the tire cavity may remove the insert without disturbing the mold, and a plug in the insert covering the upper end of the screw and having its top surface flush with the mold surface.

4. The combination of a mold member having a cavity for the formation of part of an automobile tire, a recess in said cavity having a tapered wall and a flat bottom, an opening in the mold beyond the recess having an enlargement, an insert having a wall tapered complementarily to that of the mold, said insert occupying the recess and having a flat bottom and a threaded opening extending through the insert, a screw having a head occupying the enlargement of said opening with the shank of the screw extending through the opening and threaded into the insert, an angular recess in the inner end of the screw shank for the application of a wrench, whereby the screw may be rotated by a tool within the mold cavity to install or to free the insert and means for closing the space in the insert above the upper end of the screw shank, the upper surface of such closing means being substantially flush with the top surface of the insert.

5. The combination of a tire mold having a general cavity for the formation of a tire, and having a recess, an insert occupying the recess, a screw accessible from the mold cavity itself and serving to hold the insert within the recess, and a plug of comparatively soft metal in the opening of the recess above the screw, said soft metal plug having its top surface substantially flush with the top surface of the insert.

6. The combination with a tire mold having a general cavity for the formation of a tire surface, a conical recess in said cavity having a screw threaded cylindrical extension from such conical recess, and a plug having a conical head with a threaded shank, said shank being adapted to occupy the threaded cylindrical extension of the mold while the plug's conical head occupies the conical recess, the top of the plug being formed on an incline to be flush with the surface of the mold cavity when the plug is tightly sealed, there being small openings in the top surface of the plug for the application of a tool to rotate it.

7. The combination of a pair of mold members having cooperating cavities for vulcanizing a tire, an insert in one of the mold members, said insert comprising a block seated in a recess in the surface of the cavity of one of the mold members, the surface of such block being substantially flush with the surface of the cavity, and a screw threaded fastening device for securing the block to the mold accessible for rotation from within the mold cavity.

8. In combination, a tire mold comprising a rigid annulus having a molding cavity, a recess communicating with the cavity, the side walls of the recess being tapered in the direction to cause the recess to flare toward the mold cavity, an insert occupying the recess and having a tapered side surface to engage the surface of the recess, and threaded retaining means coacting with the insert and mold and accessible from within the mold cavity, whereby the insert may be removed without disturbing the tire mold.

9. The combination of a tire mold having a recess in the surface of the molding cavity thereof, an insert occupying the recess, a threaded bore extending through the insert, an opening extending from the recess through the wall of the mold having an enlargement in its outer portion, said opening being in alignment with said bore, a screw having a head on its outer end with the head occupying the enlargement and its shank extending through the opening and threaded into the insert, the inner end of the screw having means for attachment of a wrench, whereby the screw may be rotated by a tool from within the mold cavity to install or to free the insert.

10. The combination of an automobile tire mold having a mold cavity with a recess, an insert in the form of a block occupying the recess, said block having a bore extending through it of two diameters, the outer portion of the bore being smaller than the inner portion, a cap screw having a head, said head occupying the larger bore of the insert with the shank extending through the smaller bore and threaded into the wall of the mold, the inner end of such screw having means for the application of a wrench, whereby the screw may be rotated by a tool within the mold cavity to install or to free the insert, and means for plugging the opening in the insert inwardly of the head of the screw, providing a top surface flush with the surrounding surface of the insert.

11. The combination of a tire mold comprising a rigid annulus, an insert set into a recess within the mold, a screw threaded fastening device coacting with the mold and insert and having a threaded engagement with one of them, said fastening device having provision for the application of a tool from within the mold cavity to turn the fastening device.

HENRY C. BOSTWICK.